(12) United States Patent
Tamura et al.

(10) Patent No.: US 9,822,968 B2
(45) Date of Patent: Nov. 21, 2017

(54) BURNER

(71) Applicant: IHI Corporation, Koto-ku, Tokyo (JP)

(72) Inventors: Masato Tamura, Tokyo (JP);
Ryunosuke Itokazu, Tokyo (JP)

(73) Assignee: IHI Corporation, Tokyo (JP)

( * ) Notice: Subject to any disclaimer, the term of this patent is extended or adjusted under 35 U.S.C. 154(b) by 443 days.

(21) Appl. No.: 14/411,729

(22) PCT Filed: Apr. 24, 2013

(86) PCT No.: PCT/JP2013/062736
§ 371 (c)(1),
(2) Date: Dec. 29, 2014

(87) PCT Pub. No.: WO2014/006969
PCT Pub. Date: Jan. 9, 2014

(65) Prior Publication Data
US 2015/0176840 A1    Jun. 25, 2015

(30) Foreign Application Priority Data
Jul. 2, 2012   (JP) .................................. 2012-148471

(51) Int. Cl.
*F23L 7/00* (2006.01)
*F23D 1/02* (2006.01)
(Continued)

(52) U.S. Cl.
CPC .................. *F23D 1/02* (2013.01); *F23C 7/02* (2013.01); *F23K 3/02* (2013.01); *F23L 7/007* (2013.01);
(Continued)

(58) Field of Classification Search
CPC .............................. F23D 1/00; F23D 2201/00
See application file for complete search history.

(56) References Cited

U.S. PATENT DOCUMENTS

2002/0144636 A1   10/2002   Tsumura et al.
2005/0120927 A1   6/2005    Okazaki et al.
(Continued)

FOREIGN PATENT DOCUMENTS

EP    2677238 A1    12/2013
JP    63-142095 A    6/1988
(Continued)

OTHER PUBLICATIONS

European communication dated Feb. 9, 2016 in corresponding European patent application No. 13813164.4.
(Continued)

*Primary Examiner* — David J Laux
(74) *Attorney, Agent, or Firm* — Nields, Lemack & Frame, LLC (57) ABSTRACT

A burner comprises a nozzle main body (7) which is installed along a central axis of a throat (4) provided on a furnace wall (3) and comprises an inner nozzle (11) in which an auxiliary combustion air (24) flows and an outer nozzle (9) which is provided on an outer side and concentrically with the inner nozzle and in which a pulverized coal mixed flow (18) obtained by mixing a carrying medium with a pulverized coal flow, a wind box (5) for accommodating the nozzle main body, a secondary air regulator (8) accommodated in the wind box and provided at a tip portion of the nozzle main body, an auxiliary combustion air intake pipe (23) for introducing a combustion air as an auxiliary combustion air (22) into the inner nozzle from the wind box, a pulverized coal flow supply pipe (16) for introducing a pulverized coal mixed flow into the outer nozzle, and an oxygen-containing gas supply pipe (17) for supplying an oxygen-containing gas (19) to the pulverized coal mixed flow and raising the oxygen concentration in the pulverized coal mixed flow.

5 Claims, 5 Drawing Sheets

(51) Int. Cl.
  *F23K 3/02* (2006.01)
  *F23L 9/00* (2006.01)
  *F23C 7/02* (2006.01)
(52) U.S. Cl.
  CPC ............ *F23L 9/00* (2013.01); *F23D 2201/20* (2013.01); *Y02E 20/344* (2013.01)

(56) References Cited

U.S. PATENT DOCUMENTS

| | | | | |
|---|---|---|---|---|
| 2010/0162930 | A1* | 7/2010 | Okazaki | F23C 7/008 110/190 |
| 2011/0073020 | A1 | 3/2011 | Taniguchi et al. | |

FOREIGN PATENT DOCUMENTS

| | | |
|---|---|---|
| JP | 7-293823 A | 11/1995 |
| JP | 8-110014 A | 4/1996 |
| JP | 9-178116 A | 7/1997 |
| JP | 10-38216 A | 2/1998 |
| JP | 10-205712 A | 8/1998 |
| JP | 2001-26787 A | 1/2001 |
| JP | 2002-340306 A | 11/2002 |
| JP | 2005-140480 A | 6/2005 |
| JP | 2008-196741 A | 8/2008 |
| JP | 2009-264654 A | 11/2009 |
| JP | 2011-75175 A | 4/2011 |
| WO | 02/12791 A1 | 2/2002 |

OTHER PUBLICATIONS

International Search Report and Written Opinion dated Jun. 25, 2013 in corresponding PCT application No. PCT/JP2013/062736.
International Preliminary Report on Patentability dated Jan. 15, 2015 in corresponding PCT application No. PCT/JP2013/062736.

* cited by examiner

BURNER

TECHNICAL FIELD

The present invention relates to a burner provided on a wall surface of a boiler furnace and burns fuels such as pulverized coal, and more particularly to a burner that performs oxyfiring so that a carbon dioxide can be captured easily.

BACKGROUND ART

In a burner which burns a pulverized coal in a furnace of a boiler, there is a burner, for performing oxyfiring, which makes the greater part of recirculated flue gas become a carbon dioxide and makes it easy to capture carbon dioxide, by using a mixed a gas of recirculated flue gas and oxygen as a carrying medium to carry a pulverized coal and likewise by using the mixed gas of recirculated flue as and oxygen as a combustion air.

Further, since there is a possibility that in a case where the mixed gas of recirculated flue gas and oxygen is used as the carrying medium, the oxygen concentration in the carrying medium increases due to an emergency stop or the like of an apparatus and the pulverized coal ignites during carriage, a burner such that does not mix oxygen into a carrying medium and only uses recirculated flue gas as the carrying medium has also been devised.

However, in a case where only the recirculated flue gas is used as the carrying medium without mixing the oxygen into the recirculated flue gas, since the oxygen concentration in the recirculated flue gas is as low as approximately 3% to 5%, the oxygen is not sufficiently supplied to a pulverized coal mixed flow even if the combustion air is supplied from the periphery at the time of the combustion, and thus, a problem may arise that the ignition becomes unstable.

It is to be noted that Patent Document 1 discloses an oxyfuel boiler plant which spurts out a primary gas, which is a mixture of pulverized coal and recirculated flue gas, from the center of the burner into a furnace, supplies a secondary gas from a periphery of the primary gas, supplies a tertiary gas provided by dividing the secondary gas from a periphery of the secondary gas, and has an oxygen-enriched gas spurt nozzle that spurts out an oxygen-enriched gas installed in the primary system piping on the burner upstream side.

CONVENTIONAL ART REFERENCE

Patent Document

Patent Document 1: JP-A-2011-75175

DISCLOSURE OF INVENTION

Problem to be Solved by the Invention

To solve the problems as described above, it is an object of the present invention to provide a burner that attempts to improve the ignition stability of the pulverized coal while maintaining a carrying medium in a low-oxygen state.

Means for Solving the Problem

The present invention relates to a burner, comprising, a nozzle main body which is installed along a central axis of a throat provided on a furnace wall and comprises an inner nozzle in which an auxiliary combustion air flows and an outer nozzle which is provided on an outer side and concentrically with the inner nozzle and in which a pulverized coal mixed flow obtained by mixing a carrying medium with a pulverized coal flow, a wind box for accommodating the nozzle main body, a secondary air regulator accommodated in the wind box and provided at a tip portion of the nozzle main body, an auxiliary combustion air intake pipe for introducing a combustion air as an auxiliary combustion air into the inner nozzle from the wind box, a pulverized coal flow supply pipe for introducing a pulverized coal mixed flow into the outer nozzle, and an oxygen-containing gas supply pipe for supplying an oxygen-containing gas to the pulverized coal mixed flow and raising the oxygen concentration in the pulverized coal mixed flow.

Further, the present invention relates to a burner, further comprising two or more deflector angles extending on an inner peripheral surface of the outer nozzle along an axial direction of the outer nozzle, wherein a flow path of an oxygen-containing gas is formed in each of the deflector angles, a ring pipe communicating with the flow path is connected across base ends of the deflector angles and the oxygen-containing gas supply pipe penetrating a peripheral wall of the outer nozzle is connected to the ring pipe.

Further, the present invention relates to a burner, wherein the oxygen-containing gas supply pipe communicates with a base of the outer nozzle, and the oxygen-containing gas is supplied from the base of the outer nozzle.

Further, the present invention relates to a burner, further comprising a hollow concentration adjustment ring for surrounding the inner nozzle, wherein two or more holes for spurting out oxygen-containing injection gas are provided at a tip surface of the concentration adjustment ring, and the oxygen-containing gas supply pipe as inserted in the inner nozzle and for penetrating a peripheral wall of the inner nozzle is connected to the concentration adjustment ring.

Furthermore, the present invention relates to a burner, further comprising a first concentration adjustment ring for surrounding the inner nozzle and a second concentration adjustment ring provided on an inner peripheral surface of the outer nozzle over an entire circumference on a base side than the first concentration adjustment ring, wherein at least one concentration adjustment ring of the first concentration adjustment ring and the second concentration adjustment ring is hollow and has two or more holes for spurting out oxygen-containing gas provided at a tip surface, and the oxygen-containing gas supply pipe is connected to the one concentration adjustment ring.

Effect of the Invention

According to the present invention, a burner comprises a nozzle main body which is installed along a central axis of a throat provided on a furnace wall and comprises an inner nozzle in which an auxiliary combustion air flows and an outer nozzle which is provided on an outer side and concentrically with the inner nozzle and in which a pulverized coal mixed flow obtained by mixing a carrying medium with a pulverized coal flow, a wind box for accommodating the nozzle main body, a secondary air regulator accommodated in the wind box and provided at a tip portion of the nozzle main body, an auxiliary combustion air intake pipe for introducing a combustion air as an auxiliary combustion air into the inner nozzle from the wind box, a pulverized coal flow supply pipe for introducing a pulverized coal mixed flow into the outer nozzle, and an oxygen-containing gas supply pipe for supplying an oxygen-containing gas to the pulverized coal mixed flow and raising the oxygen concentration in the pulverized coal mixed flow. As a result, the ignition can be stabilized and the ignition can be promoted even in a case where the oxygen concentration in the pulverized coal mixed flow is low, and by shortening a path along which the pulverized coal mixed flow having the increased oxygen concentration flows, improvement of safety can be attempted.

BEST MODES FOR CARRYING OUT THE INVENTION

A description will be given below on an embodiment of the present invention by referring to the attached drawings.

First, in FIG. 1, a description will be given on a burner 1 according to a first embodiment of the present invention.

Figure 1:
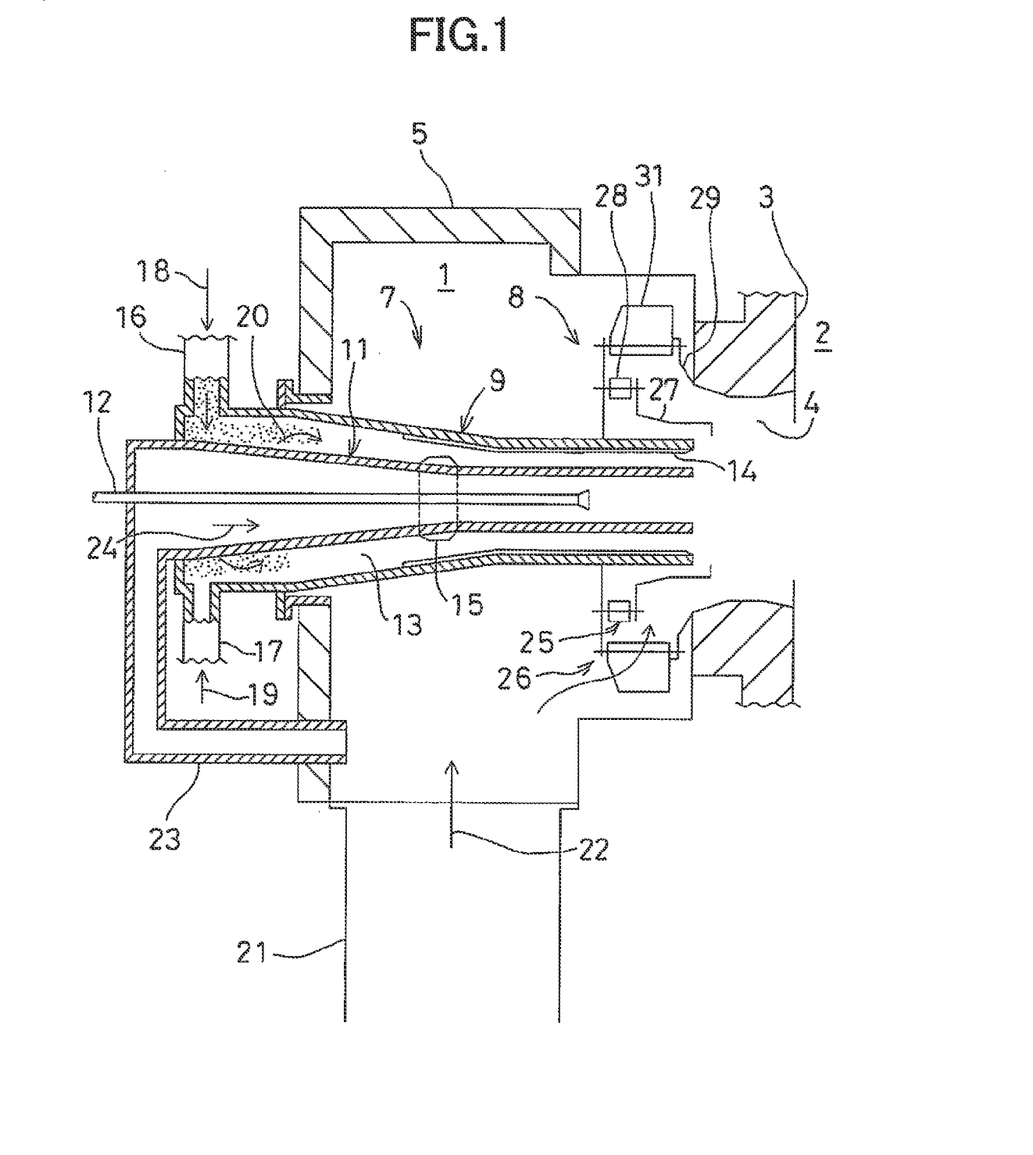
FIG. 1 is a schematic sectional elevational view which shows a burner according to a first embodiment of the present invention.

In FIG. 1, reference numeral 2 denotes a furnace and reference numeral 3 denotes a furnace wall of the furnace 2. A throat 4 is provided on the furnace wall 3, a wind box 5 is provided on the furnace wall 3 on an opposite side of a furnace 2, and the burner 1 is provided inside the wind box 5 concentrically with the throat 4.

The burner 1 comprises a nozzle main body 7 and a secondary air regulator 8 provided so as to surround a tip portion an end portion of the furnace inner side) of the nozzle main body 7.

The nozzle main body 7 comprises an outer nozzle 9 and an inner nozzle 11 which are concentrically provided, and an oil burner 12 arranged on a center line of the inner nozzle 11, and each of the outer nozzle 9 and the inner nozzle 11 has a diameter reducing structure where a diameter gradually decreases respectively. Further, each of the shape of the cross section of the outer nozzle 9 and the inner nozzle 11 is circular, and a fuel guiding space 13 which is a hollow cylindrical space and which has an open end on the furnace 2 side is formed between the outer nozzle 9 and the inner nozzle 11.

On an inner peripheral surface of the outer nozzle 9, deflector angles 14 each having a triangular cross section are arranged as many as required in a circumferential direction at a predetermined angle pitch, e.g., at intervals of 45°, and a concentration adjustment ring 15 that surrounds the inner nozzle 11 is provided on the inner nozzle 11.

A pulverized coal flow supply pipe 16 and an oxygen-containing gas supply pipe 17 is communicated with a base (an end on the opposite side of the furnace 2) of the outer nozzle 9 respectively from a tangential direction to the outer nozzle 9. The pulverized coal flow supply pipe 16 is connected with a pulverized coal mill (not shown), and a pulverized coal mixed flow 18, in which a carrier medium (referred to as a primary air hereinafter) is mixed with the pulverized coal, flows into the fuel guiding space 13 via the pulverized coal flow supply pipe 16 from a tangential direction.

It is to be noted that the oxygen concentration of the primary air in the pulverized coal mixed flow 18 is lowered to, e.g., approximately 3% to 5% since the recirculated flue gas of the pulverized coal combusted in the furnace 2 is mixed with the air having the oxygen concentration of 21% or the recirculated flue gas is used as it is, and even if the pulverized coal mixed flow 18 has a high temperature in a carrying process from pulverizing by the pulverized coal mill to flowing in of the fuel guiding space 13, it is configured so that a pulverized coal does not ignite.

Further, the oxygen-containing gas supply pipe 17 is connected to an oxygen-containing gas supply source (not shown), and an oxygen-containing gas 19 such as pure oxygen or a mixed gas of oxygen and carbon dioxide or the like flows into the fuel guiding space 13 from the tangential direction via the oxygen-containing as supply pipe 17.

The pulverized coal mixed flow 18 and the oxygen-containing gas 19, which flow into the fuel guiding space 13, are mixed while swirling inside the fuel guiding space 13, and are spurted out, as an oxygen-containing pulverized coal flow 20 with a predetermined oxygen concentration, e.g., an oxygen concentration of 16% to 21%, from a tip of the fuel guiding space 13.

The oxygen-containing gas supply pipe 17 communicates with the base of the outer nozzle 9 from an axial direction. It is arranged so that the oxygen-containing gas 19 may flow into the fuel guiding space 13 from the axial direction via the oxygen-containing as supply pipe 17.

Further, a secondary air flow duct 21 communicates with the wind box 5 and a secondary air 22 flows in as a combustion air via the secondary air flow duct 21. As the secondary air 22, a mixed gas obtained by mixing an oxygen with a recirculated flue gas provided when the pulverized coal is combusted in the furnace 2, e.g., a mixed gas containing approximately 30% oxygen and approximately 70% carbon dioxide, is used.

Further, a tertiary it intake pipe 23, as an auxiliary combustion air intake pipe which is opened inside the wind box 5, communicates with a base of the inner nozzle 11, and the secondary air 22 supplied to the wind box 5 is taken in and is introduced into the inner nozzle 11 as a combustion auxiliary air, i.e., a tertiary air 24.

The secondary air regulator 8 is constituted of an auxiliary air regulating mechanism 25 which accommodates a tip portion of the nozzle main body 7 and a main air regulating mechanism 26 provided on an outer side of the auxiliary air regulating mechanism 25 in a multiple concentric manner.

The auxiliary air regulating mechanism 25 has a first air guide duct 27 of which a diameter is gradually decreased toward a tip and many inner air vanes 28 provided rotatably. The inner air vanes 28 can synchronously turn via a link mechanism (not shown) and change an inclination angle with respect to the air flow. Further, the main air regulating mechanism 26 has a second air guide duct 29 of which its diameter is gradually decreased toward a tip and has many outer air vanes 31 provided rotatably at equal intervals on the circumference, and the outer air vanes 31 can synchronously turn via a link mechanism (not shown) in the same way as the inner air vanes 28, and change an inclination angle with respect to the air flow.

The tip of the second air guide duct 29 is continuous with the throat 4, the tip of the first air guide duct 27 is placed at a position retreated from an inner wall surface of the furnace wall 3, and tips of the outer nozzle 9 and the inner nozzle 11 are also placed at positions retreated from the inner wall surface of the furnace wall 3.

Next, description will be given below on the combustion in the burner 1.

The pulverized coal pulverized by a pulverized mill (not shown) is carried by a primary air and supplied to a base of the fuel guiding space 13 as the pulverized coal mixed flow 18 via the pulverized coal supply pipe 16, and the oxygen-containing gas 19 is supplied from an oxygen-containing gas supply source (not shown) to the base of the fuel guiding space through the oxygen-containing gas supply pipe 17.

The pulverized coal mixed flow 18 and the oxygen-containing gas 19 supplied to the base of the fuel guiding space 13 flow toward the furnace 2 while swirling in the fuel guiding space 13. The pulverized coal mixed flow 18 and the oxygen-containing gas 19 are mixed during a process of swirling in the fuel guiding space 13 and become the oxygen-containing pulverized coal flow 20 with increased oxygen concentration, and the pulverized coal concentration and the oxygen concentration in the oxygen-containing pulverized coal flow 20 are uniformed by the swirling.

Further, the oxygen-containing pulverized coal flow 20 is reduced in size, accelerated, and rectified during a process of passing through the outer nozzle 9. At this time, by the concentration adjustment ring 15, the oxygen-containing pulverized coal flow 20 is deflected and the pulverized coal concentration is adjusted, and further, by the deflector angles 14, the pulverized coal in the oxygen-containing pulverized coal flow 20 is further uniformed and the swirling is suppressed, a speed in the axial direction is provided, and the oxygen-containing pulverized coal flow 20 is spurted out from the tip of the outer nozzle 9.

The oxygen-containing pulverized coal flow 20 is subjected to the temperature rise by the secondary air 22 while being spurted out to the furnace 2 and is further heated up by receiving a radiation heat from inside of the furnace 2. By the heating, volatile component is discharged from the pulverized coal, the volatile component is ignited and a flame is continuously maintained.

The secondary air 22, that is a combustion air, is risen to a predetermined temperature and is supplied to the wind box 5. The secondary air 22 is swirled by the outer air vane 31 and spurted out into the furnace 2 together with the oxygen-containing pulverized coal flow 20 through the secondary air guide duct 29.

It is to be noted that a part of the secondary air 22 taken into the secondary air guide duct 29 is taken into the first air guide duct 27 through the inner air vanes 28 and spurted out as a secondary auxiliary air. Further, the inner air vanes 28 are inclined with respect to an air flow and it is so arranged that a swirl flow is given to the part of the secondary air 22 thus taken in.

The air amount adjustment performed by the outer air vanes 31 and the intensity adjustment and the air amount adjustment of the swirl flow performed by the inner air vanes 28 change a supply amount and a flow state of the secondary air 22, and a combustion state of the pulverized coal is adjusted.

Further, the part of the secondary air 22 is guided as the tertiary air 24 to the inner nozzle 11 via the tertiary air intake pipe 23 and spurted out from the inner nozzle 11. By the tertiary air 24 being spurted out, the combustion state of the pulverized coal is adjusted. Therefore, the adjustment is carried out so that the combustion state of the pulverized coal becomes the best suitable state by the adjustment of the secondary air 22 and the adjustment of the tertiary air 24, etc.

As described above, in the first embodiment, since the oxygen-containing gas 19 is supplied from the base of the outer nozzle 9 via the oxygen-containing gas supply pipe 17, the oxygen-containing gas 19 is mixed in the process that the pulverized coal mixed flow 18 flows in the fuel guiding space 13 and the oxygen-containing pulverized coal flow 20 having the oxygen concentration sufficient for ignition is provided, the oxygen concentration can be sufficiently increased at a stage where the oxygen-containing pulverized coal flow 20 is spurted out from the outer nozzle 9, and even if the oxygen concentration in the pulverized coal mixed flow 18 supplied to the fuel guiding space 13 is low, the ignition can be stabilized and the ignition can be promoted.

Further, since it is arranged so that the oxygen-containing gas 19 is supplied from the base of the outer nozzle 9 and the oxygen-containing pulverized coal flow 20 having the oxygen concentration sufficient for the ignition flows only in the fuel guiding space 13, the pulverized coal mixed flow 18 pulverized by the pulverized coal mill (not shown) and supplied so the fuel guiding space 13 can become a low-oxygen state, a path where the oxygen-containing pulverized coal flow 20 flows can be shortened, the pulverized coal can be prevented from igniting and safety can be improved.

Further, since it is structured that the oxygen-containing gas supply pipe 17 is connected to the outer nozzle 9 and is not extended to the inside of the fuel guiding space 13, the oxygen-containing gas supply pipe 17 is not exposed in the fuel guiding space 13, and it is possible to prevent the oxygen-containing gas supply pipe 17 from becoming worn due to the pulverized coal.

Further, since the secondary air 22 of the wind box 5 is supplied to the inner nozzle 11 via the tertiary air intake pipe 23, the combustion air can be supplied from the inner side and the outer side of the outer nozzle 9 from which the oxygen-containing pulverized coal flow 20 is spurted out, the mixing of the pulverized coal and oxygen can be promoted, and the stability of the ignition of the pulverized coal can be further enhanced.

Further, since the oxygen-containing gas 19 is supplied into the fuel guiding space 13 via the oxygen-containing gas supply pipe 17, the recirculated flue as when combusting the pulverized coal in the furnace 2 is mixed with an air having the oxygen concentration of 21%, and a primary air is provided or since the recirculated flue gas is directly used as the primary air, the ratio of carbon dioxide in the air used for the combustion of the pulverized coal in the furnace 2 becomes high, almost all of the flue gas after the combustion becomes carbon dioxide and capturing of the carbon dioxide can be easily carried out in a process after the combustion.

Figure 2:
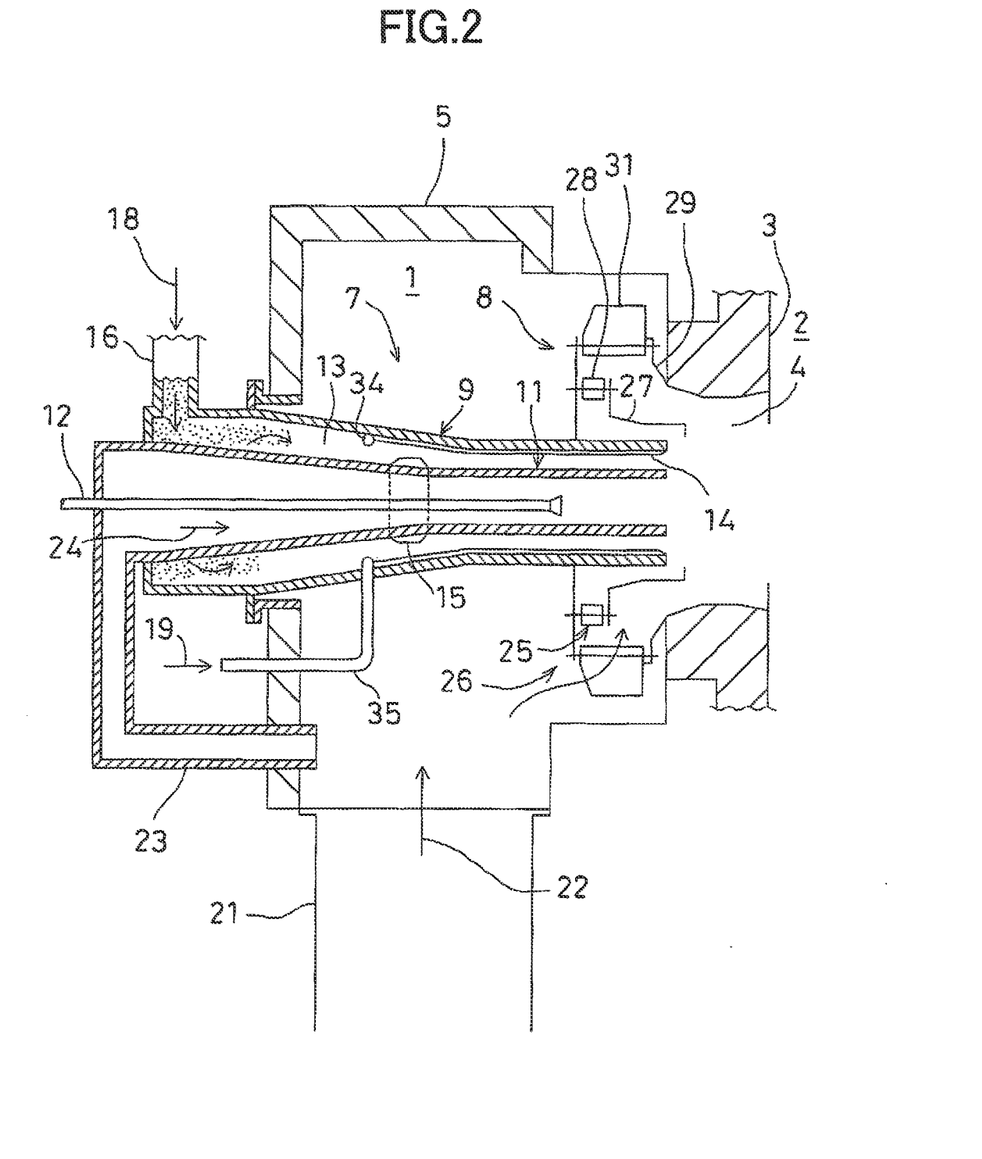
FIG. 2 is a schematic sectional elevation view which shows a burner according to a second embodiment of the present invention.
Figure 3:
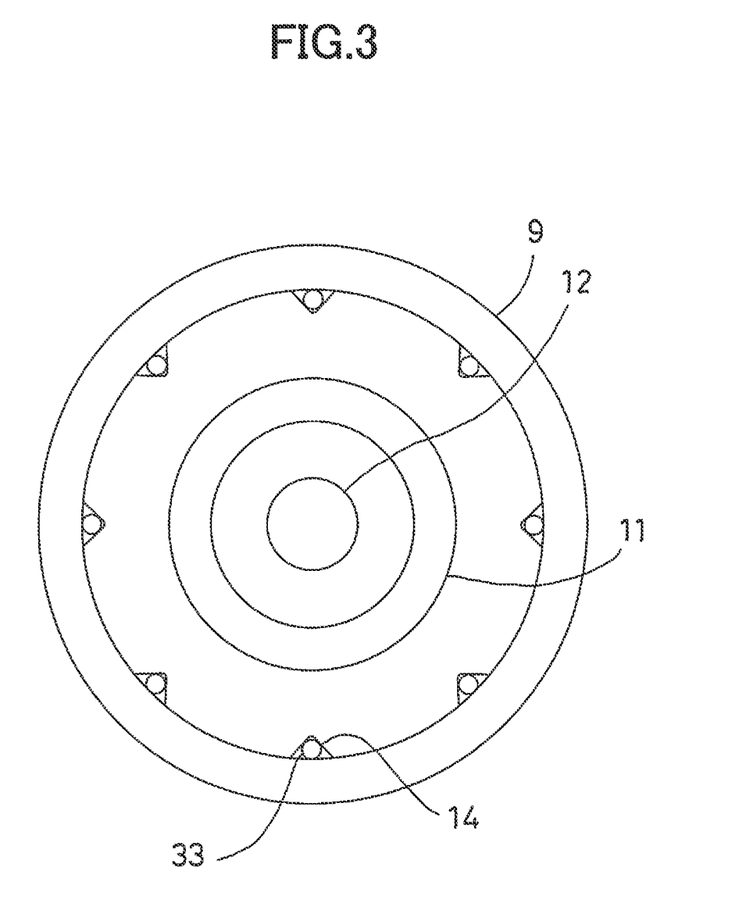
FIG. 3 is a front view which shows a nozzle main body of a burner according to a second embodiment.

Next, referring to FIG. 2 and FIG. 3, description will be given on a second embodiment according to the present invention. It is to be noted that, in FIG. 2 and FIG. 3, the same component as shown in FIG. 1 is referred by the same symbol, and detailed description is omitted.

In a burner 1 according to the second embodiment, an oxygen-containing gas intake pipe 33 which forms a flow path of an oxygen-containing gas 19 is inserted inside each deflector angle 14, a ring pipe 34 which is put over each deflector angle 14 is connected to a base end of the deflector angle 14, and each oxygen-containing gas intake pipe 33 and the ring pipe 34 communicate with each other.

Further, an oxygen-containing gas supply pipe 35 penetrating an outer nozzle 9 is connected to the ring pipe 34, she oxygen-containing gas supply pipe 35 is connected to an oxygen-containing gas supply source (not shown), and the oxygen-containing gas 19 such as pure oxygen or a mixed gas of oxygen and carbon dioxide, or the like, is supplied to the ring pipe 34 from the oxygen-containing gas supply source via the oxygen-containing as supply pipe 35.

In the second embodiment, the pulverized coal pulverized by a pulverized coal mill (not shown) is supplied into a fuel guiding space 13 together with the primary air via a pulverized coal flow supply pipe 16 as a pulverized coal mixed flow 18, and the oxygen-containing gas 19 is supplied to the ring pipe 34 via the oxygen-containing gas supply pipe 35.

The pulverized coal mixed flow 18 supplied into the fuel guiding space 13 from a tangential direction is uniformed during a process of swirling in the fuel guiding space 13, reduced in size, accelerated, and rectified during a process of passing through an outer nozzle 9. Further, the pulverized coal concentration in the pulverized coal mixed flow 18 is adjusted by a concentration adjustment ring 15. By the deflector angles 14, the pulverized coal in the pulverized coal mixed flow 18 is further uniformed, the swirling is suppressed and a speed in an axial direction is given, and the pulverized coal mixed flow 18 is spurted out from a tip of the outer nozzle 9.

Further, the oxygen-containing gas 19 supplied to the ring pipe 34 flows through the inside of the ring pipe 34, is introduced into each oxygen-containing gas intake pipe 33, and is spurted out from the tips of each oxygen-containing gas intake pipe 33, i.e., the tips of each deflector angle 14.

Therefore, in the second embodiment, since it is structured so that the oxygen-containing gas 19 is supplied to the pulverized coal mixed flow 18 from the tip of each deflector angle 14, the oxygen-containing gas 19 and the pulverized coal mixed flow 18 can be easily mixed, and even if the oxygen concentration in the pulverized coal mixed flow 18 is low, the ignition of the pulverized coal can be stabilized and the ignition can be promoted.

Further, similarly to the first embodiment, since a secondary air 22 is supplied to the inner nozzle 11 via a tertiary air intake pipe 23, the combustion air can be supplied from an inner side and an outer side of the pulverized coal mixed flow 18 spurted out from the outer nozzle 9, the mixing of the pulverized coal and oxygen can be promoted, and the stability of the ignition of the pulverized coal can be further enhanced.

Further, since the oxygen-containing gas supply pipe 35 passes through the outer nozzle 9 and is connected to the ring pipe 34, the oxygen-containing gas supply tube 35 is not exposed in the fuel guiding space 13, and it is possible to prevent the oxygen-containing gas supply pipe 35 from becoming worn due to the pulverized coal.

It is to be noted that, in the second embodiment, the oxygen-containing gas intake pipes 33 are inserted in the deflector angles 14 and the oxygen-containing gas intake pipes 33 serve as the flow path of the oxygen-containing gas 19, but each of the deflector angles 14 may be a hollow structure and the deflector angles 14 themselves may serve as the flow path of the oxygen-containing gas 19.

Figure 4:
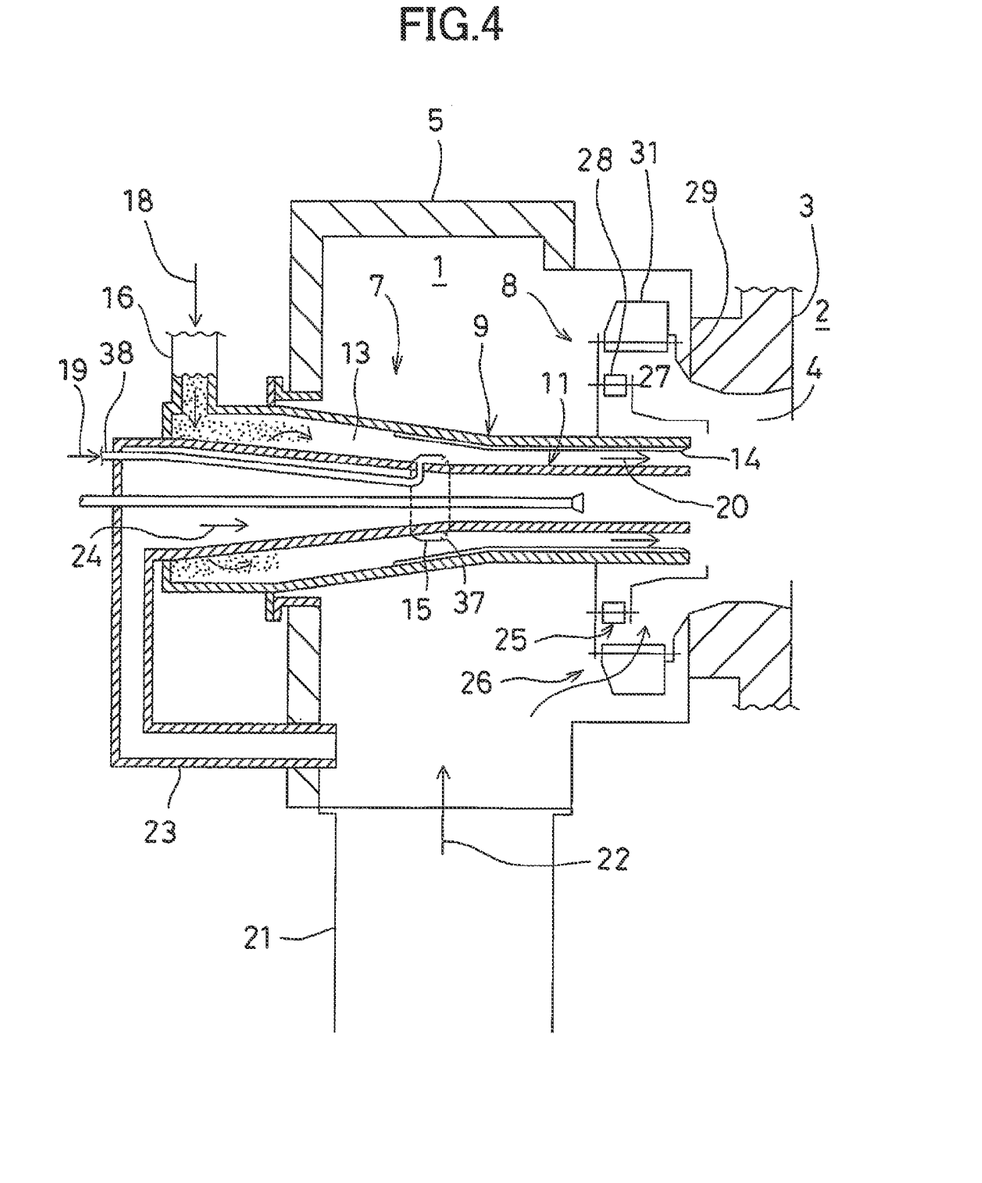
FIG. 4 is a schematic sectional elevational view which shows a burner according to a third embodiment of the present invention.

Next, referring to FIG. 4, description will be given on a third embodiment according to the present invention. It is to be noted that, in FIG. 4, the same component as shown in FIG. 1 is referred by the same symbol, and detailed, description is omitted.

In the third embodiment, a concentration adjustment ring 15 has a hollow structure, and a plurality of oxygen-containing gas spurt out holes 37 are formed at a tip surface of the concentration adjustment ring 15 at an equal angle pitch.

Further, the concentration adjustment ring 15 is inserted in an inner nozzle 11 and connected with an oxygen-containing gas supply pipe 38 penetrating a peripheral wall of the inner nozzle 11.

The oxygen-containing gas supply pipe 38 is connected to an oxygen-containing gas supply source, not shown, and an oxygen-containing gas 19 such as pure oxygen or a mixed gas of oxygen and carbon dioxide is supplied into the concentration adjustment ring 15 via the oxygen-containing gas supply pipe 38 and spurted out into the fuel guiding space 13 from the oxygen-containing gas spurt out holes 37.

In the third embodiment, by supplying the oxygen-containing gas 19 to a pulverized coal mixed flow 18 supplied via a pulverized coal supply pipe 16 via the concentration adjustment ring 15, the pulverized coal mixed flow 18 and the oxygen-containing gas 19 is mixed and an oxygen-containing pulverized coal flow 20 having the oxygen concentration sufficient to ignite the pulverized coal can be provided at a stage of spurting out from a tip of the outer nozzle 9.

Therefore, even in a case where the oxygen concentration in the pulverized coal mixed flow 18 supplied to the fuel guiding space 13 is low, the ignition of the pulverized coal can be stabilized and the ignition can be promoted.

Further, by supplying the oxygen-containing gas 19 from the concentration adjustment ring 15, a path where the oxygen-containing pulverized coal flow 20 runs can be further shortened. As a result, an ignition of the pulverized coal can be avoided and safety can be improved.

Additionally, since the oxygen-containing gas supply pipe 38 is inserted in the inner nozzle 11, penetrates the peripheral wall of the inner nozzle 11 and is connected to the concentration adjustment ring 15, the oxygen-containing gas supply pipe 38 is not exposed in the Fuel guiding space 13 and the wear of the oxygen-containing gas supply pipe 38 due to the pulverized coal can be avoided.

A burner 1 according to the third embodiment may further comprise the configuration of the second embodiment, i.e., an oxygen-containing gas intake pipe 33 (see FIG. 3) inserted in the deflector angles 14, the ring pipe 34 (see FIG. 2) connected across the base ends of the deflector angles 14 and the oxygen-containing as supply pipe 35 (see FIG. 2) which penetrates the peripheral wall of the outer nozzle 9 and is connected to the ring pipe 34.

Figure 5:
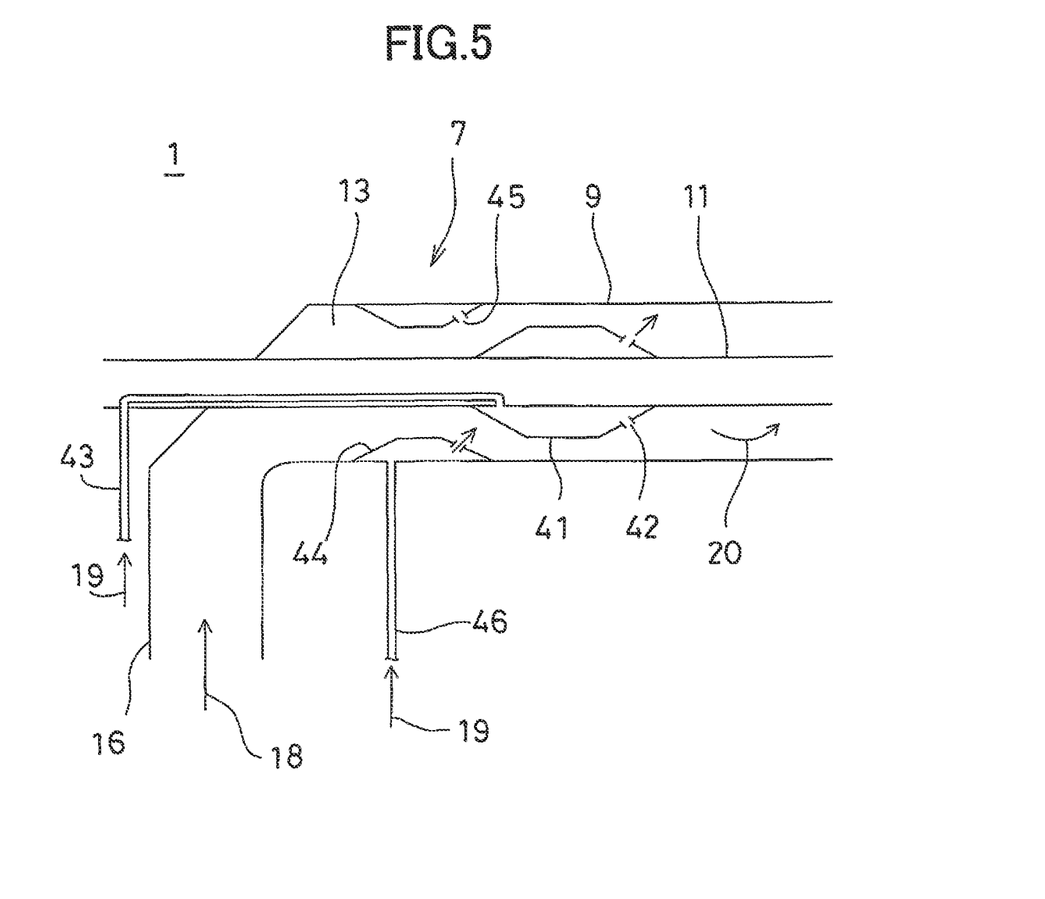
FIG. 5 is a schematic sectional elevational view which shows a burner according to a fourth embodiment.

Next, referring to FIG. 5, description will be given on a fourth embodiment according to the present invention. It is to be noted that, in FIG. 5, the same components as shown in FIG. 1 is referred by the same symbol, and detailed description is omitted.

In a burner 1 according to the fourth embodiment, a hollow first concentration adjustment ring which an inner nozzle 11 is provided in a fuel guiding space 13. The first concentration adjustment ring 41 has a base and a tip portion formed into tapered shapes respectively and a sectional side surface is in form of a trapezoidal shape. A plurality of first oxygen-containing gas spurt out holes 42 are formed at an equal angle pitch in an inclined surface of the first concentration adjustment ring 41 on the tip side.

Further, a first oxygen-containing gas supply pipe 43 is connected to the first concentration adjustment ring 41. The first oxygen-containing gas supply pipe 43 is inserted in the inner nozzle 11 and penetrates a peripheral wall of the inner nozzle 11 so that the first oxygen-containing supply pipe 43 is not exposed in the fuel guiding space 13.

The first oxygen-containing gas supply pipe 43 is connected with an oxygen-containing gas supply source (not shown), and an oxygen-containing gas 19 such as pure oxygen or a mixed gas of oxygen and carbon dioxide, or the like, is supplied into the first concentration adjustment rind 41 via the first oxygen-containing gas supply pipe 43 and spurted out into the fuel guiding space 13 through the first oxygen-containing gas spurt out holes 42.

Further, a hollow second concentration adjustment ring 44 is provided on an inner peripheral, surface of an outer nozzle 9 on a base side than the first concentration adjustment ring 41 over the entire circumference. The second concentration adjustment ring 44 has a base and a tip portion formed into tapered shapes respectively and a sectional side surface is in form of a trapezoidal shape. A plurality of second oxygen-containing gas spurt out holes 45 are formed at an equal angle pitch in an inclined surface of the second concentration adjustment ring 44 on the tip side.

A second oxygen-containing gas supply pipe 46 penetrating a peripheral wall of the outer nozzle 9 is connected to the second concentration adjustment ring 44 so that the second oxygen-containing gas supply pipe 46 is not exposed in the fuel guiding space 13.

The second oxygen-containing as supply pipe 46 is connected to an oxygen-containing gas supply source (not shown), and the oxygen-containing gas 19 is supplied into the second concentration adjustment ring 44 via the second oxygen-containing gas supply pipe 46 and spurted out into the fuel guiding space 13 through the second oxygen-containing as spurt out holes 45.

In the fourth embodiment, by supplying the oxygen-containing gas 19 to a pulverized coal mixed flow 18, which has been supplied via a pulverized coal flow supply pipe 16, via the first concentration adjustment ring 41 and the second concentration adjustment ring 44, the pulverized coal mixed flow 18 and the oxygen-containing gas 19 is mixed and an oxygen-containing pulverized coal flow 20 having the oxygen concentration sufficient to ignite the pulverized coal can be provided at a stage of the spurt out from a tip of the outer nozzle 9.

Therefore, even in a case where the oxygen concentration in the pulverized coal mixed flow 18 supplied into the fuel guiding space 13 is low, the oxygen sufficient to combust the pulverized coal can be obtained, the ignition of the pulverized coal can be stabilized and the ignition can be promoted.

Further, the concentration of the pulverized coal in the oxygen-containing pulverized coal flow 20 can be uniformed by the first concentration adjustment ring 41 and the second concentration adjustment ring 44 and a generated flame can be stabilized.

Additionally, since the first oxygen-containing gas supply pipe 43 and the second oxygen-containing gas supply pipe 46 are not exposed in the fuel guiding space 13 respectively, the wear of the first oxygen-containing gas supply pipe 43 and the second oxygen-containing gas supply pipe 46 due to the pulverized coal can be avoided.

It is to be noted that, in the fourth embodiment, the oxygen-containing gas supply pipes 43 and 46 are connected to both the first concentration adjustment ring 41 and the second concentration adjustment ring 44 and the oxygen-containing gas 19 is spurted out via the oxygen-containing gas spurt out holes 42 and 45, but it can be configured so that the oxygen-containing gas 19 may be spurted out from either one of the first concentration adjustment ring 41 or the second concentration adjustment ring 44.

INDUSTRIAL APPLICABILITY

By the fact that an oxygen-containing gas can be supplied into a pulverized coal mixed flow having a low oxygen concentration, the oxygen concentration in the pulverized coal mixed flow can be raised and the ignition can be stabilized. And by supplying the oxygen-containing gas into the pulverized coal mixed flow which has been supplied into an outer nozzle, a path where the pulverized coal mixed flow runs is shortened, which can be applied to an improvement of safety.

LEGEND OF REFERENCE NUMERALS

1 Burner
2 Furnace
3 Furnace wall
4 Throat
5 Wind box
7 Nozzle main body
8 Secondary air regulator
9 Outer nozzle
11 Inner nozzle
13 Fuel guiding space
14 Deflector angle
15 Concentration adjustment ring
16 Pulverized coal flow supply pipe
17 Oxygen-containing gas supply pipe
18 Pulverized coal mixed flow
19 Oxygen-containing gas
20 Oxygen-containing pulverized coal flow
22 Secondary air (combustion air)
23 Tertiary air intake pipe (auxiliary combustion air intake pipe)
24 Tertiary air (auxiliary combustion air)
33 Oxygen-containing gas intake pipe
34 Ring pipe
35 Oxygen-containing gas supply pipe
37 Oxygen-containing gas spurt out hole
38 Oxygen-containing gas supply pipe
41 First concentration adjustment ring
42 First oxygen-containing gas spurt out hole
43 First oxygen-containing gas supply pipe
44 Second concentration adjustment ring
45 Second oxygen-containing gas spurt out hole
46 Second oxygen-containing gas supply pipe

The invention claimed is:

1. A burner comprising, a nozzle main body which is installed along a central axis of a throat provided on a furnace wall and comprises an inner nozzle in which an auxiliary combustion air flows and an outer nozzle which is provided on an outer side and concentrically with said inner nozzle and in which a pulverized coal mixed flow obtained by mixing a carrying medium with a pulverized coal flow, a wind box for accommodating said nozzle main body, a secondary air regulator accommodated in said wind box and provided at a tip portion of said nozzle main body, an auxiliary combustion air intake pipe for introducing a combustion air as an auxiliary combustion air into said inner nozzle from said wind box, a pulverized coal flow supply pipe for introducing a pulverized coal mixed flow into said outer nozzle, and an oxygen-containing gas supply pipe for supplying an oxygen-containing gas to said pulverized coal mixed flow and raising the oxygen concentration in said pulverized coal mixed flow, wherein the burner comprises a first concentration adjustment ring for surrounding said inner nozzle and a second concentration adjustment ring provided on an inner peripheral surface of said outer nozzle over an entire circumference on a base side than said first concentration adjustment ring, wherein at least one concentration adjustment ring of said first concentration adjustment ring and said second concentration adjustment ring is hollow and has two or more holes for spurting out oxygen-containing gas provided at a tip surface, and said oxygen-containing gas supply pipe is connected to said one concentration adjustment ring.

2. A burner comprising, a nozzle main body which is installed along a central axis of a throat provided on a furnace wall and comprises an inner nozzle in which an auxiliary combustion air flows and an outer nozzle which is provided on an outer side and concentrically with said inner nozzle and in which a pulverized coal mixed flow obtained by mixing a carrying medium with a pulverized coal flow, a wind box for accommodating said nozzle main body, a secondary air regulator accommodated in said wind box and provided at a tip portion of said nozzle main body, an auxiliary combustion air intake pipe for introducing a combustion air as an auxiliary combustion air into said inner nozzle from said wind box, a pulverized coal flow supply pipe for introducing a pulverized coal mixed flow into said outer nozzle, and an oxygen-containing gas supply pipe for supplying an oxygen-containing gas to said pulverized coal mixed flow and raising the oxygen concentration in said pulverized coal mixed flow, wherein the burner comprises two or more deflector angles extending on an inner peripheral surface of said outer nozzle along an axial direction of said outer nozzle, wherein a flow path of an oxygen-containing gas is formed in each of said deflector angles, a ring pipe communicating with said flow path is connected across base ends of said deflector angles and said oxygen-containing gas supply pipe penetrating a peripheral wall of said outer nozzle is connected to said ring pipe, and wherein said deflector angles each comprise a triangular cross section and wherein the flow path of oxygen-containing gas comprises an oxygen-containing gas intake pipe inserted inside each of said deflector angles.

3. A burner according to claim 1, wherein said oxygen-containing gas supply pipe communicates with a base of said outer nozzle, and said oxygen-containing gas is supplied from the base of said outer nozzle.

4. A burner according to claim 2, further comprising a hollow concentration adjustment ring for surrounding said inner nozzle, wherein two or more holes for spurting out oxygen-containing injection gas are provided at a tip surface of said concentration adjustment ring, and said oxygen-containing gas supply pipe as inserted in said inner nozzle and for penetrating a peripheral wall of said inner nozzle is connected to said concentration adjustment ring.

5. A burner according to claim 2, further comprising a first concentration adjustment ring for surrounding said inner nozzle and a second concentration adjustment ring provided on an inner peripheral surface of said outer nozzle over an entire circumference on a base side than said first concentration adjustment ring, wherein at least one concentration adjustment ring of said first concentration adjustment ring and said second concentration adjustment ring is hollow and has two or more holes for spurting out oxygen-containing gas provided at a tip surface, and said oxygen-containing gas supply pipe is connected to said one concentration adjustment ring.

* * * * *